UNITED STATES PATENT OFFICE.

EDWIN W. LASBY, OF ST. LOUIS, MISSOURI.

FOOD COMPOUND.

1,060,912.     Specification of Letters Patent.     Patented May 6, 1913.

No Drawing.     Application filed November 3, 1910.     Serial No. 590,582.

*To all whom it may concern:*

Be it known that I, EDWIN W. LASBY, a citizen of the United States, residing at St. Louis and State of Missouri, have invented certain new and useful Improvements in Food Compounds, of which the following is a specification.

This invention aims to provide a compound intended for use in connection with cocoanut, almond, and other nut pastes or products. Ordinarily, in making macaroons or the like, yeast or some similar raising compound is mixed with the nut paste selected, prior to the baking of the confection, and it would seem from my knowledge of the prior art, that no attempt has heretofore been made to incorporate in such a compound an ingredient having as its object to absorb the moisture and oils driven off from the other ingredients of the compound during the baking process, and I believe that I am supported in this assertion by the fact that such confections have an oily appearance and taste and even when fresh are more or less soggy.

I therefore propose by the present invention to disclose a novel compound for use in connection with a nut paste such as above mentioned, which compound will include as one of its ingredients a substance capable to a high degree of absorbing moisture and oils.

I further propose by the present invention to obviate the employment of yeast, baking powders, and like raising compounds or substances, by selecting an oil-absorbing ingredient which will have the property of swelling or puffing upon its absorption of moisture or oils, so that during the baking process (it is during this process that said ingredient absorbs the moisture and oils driven off from the other ingredients) the mass being baked will become puffed or swollen in precisely the same manner that it would be if yeast or baking powder were mixed therewith.

The other ingredients of my compound, the composition of which will be presently fully set forth, are designed to take the place of fresh eggs heretofore added to the nut paste.

The compound embodying the present invention consists essentially of dried white of egg or albumen, vegetable gum or gums, and a desiccated cellular substance, such as will be presently more specifically referred to. The invention contemplates the employment of gum karaya, gum acacia, and gum tragacanth, either separately or in combination. The desiccated cellular substance above referred to is produced in the following manner: White corn kernels are shaved to extremely thin flakes, and these flakes are subjected, after being so shaved, to a dry heating process at a temperature sufficiently high to sterilize the flakes and gelatinize the starch, although not sufficiently high to toast or brown the flakes. After this dry heating process has been completed, the flakes are finely ground and the product is then ready for use in my compound. It will be readily understood that during the dry heating process, all moisture is expelled from the flakes so that the finished product is in fact a desiccated cellular membranous substance.

The above-mentioned ingredients are thoroughly mixed together in approximately the proportions following:

Dried white of egg _____ 4½ pounds
Gum karaya _____ 1¼ pounds
Gum acacia _____ ¾ pound
Gum tragacanth _____ ¼ pound
Of the desiccated cellular membranous substance above described _____ 5 pounds The above-described compound is designed to be incorporated with any selected nut paste, and to clearly illustrate the use of the compound, I will now state the composition of a cocoanut paste which I have used with great success. This paste consists of 52 pounds of grated cocoanut, 36 pounds of sugar, 12 pounds of glucose, 2 pounds of the desiccated cellular substance above referred to, and one-tenth of one per cent. of benzoate of soda. This paste, after having been properly prepared, is placed in a mixing machine and the compound embodying my invention as above described is added. The final product is placed upon the market in cans or other suitable packages, and will keep indefinitely and may consequently be used when desired.

In making cocoanut macaroons, I mix 5 pounds of this compound paste with three pounds of sugar and soften the mass with milk to a consistency to permit of its being deposited upon the baking sheet with a canvas sack and tube, as is ordinarily done.

During the baking process, the moisture and oils driven off from the cocoanut and the other ingredients is completely absorbed by the minute desiccated starch cells constituting the desiccated cellular substance of the compound, and these cells are in this manner caused to swell and to puff. This swelling of the cells naturally results in a puffing of the entire mass during the baking process, so that the finished product possesses the same lightness as if yeast or baking powder were employed as one of the ingredients. Furthermore, the finished confection is to all appearances entirely free from oil and has not the oily taste that such confections usually have when made by the methods of manufacture now in vogue.

Having described my invention, what I claim as new is:

1. A confection paste consisting of dried albumen, a vegetable gum, a desiccated farinaceous substance, and a nut paste.

2. A confection paste consisting of dried albumen, a vegetable gum, ground desiccated corn flakes, and a nut paste.

In testimony whereof, I affix my signature in presence of two witnesses.

EDWIN W. LASBY. [L. S.]

Witnesses:
   S. C. McCheoney,
   H. H. Brosnan.